3,161,573
METHOD FOR THE PRODUCTION OF 6-AMINOPENICILLANIC ACID

Wagn Ole Godtfredsen, Copenhagen, Denmark, assignor to Løvens Kemiske Fabrik Veb A. Kongsted, Ballerup, Denmark, a firm
No Drawing. Filed Apr. 29, 1960, Ser. No. 25,513
Claims priority, application Great Britain, May 6, 1959, 15,605/59; June 19, 1959, 21,195/59; Aug. 17, 1959, 28,080/59; Jan. 14, 1960, 1,445/60
3 Claims. (Cl. 195—36)

This invention relates to a method for the production of 6-aminopenicillanic acid.

The various penicillins may all be regarded as acyl derivatives of a common parent amine, 6-aminopenicillanic acid of the formula:

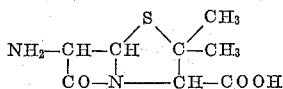

In benzylpenicillin (penicillin G) the acyl group connected with the amino group is phenylacetyl, and at an early stage of the development of the penicillin manufacture it was found that the yield of benzylpenicillin could be increased very considerably by adding phenylacetic acid to the culture medium during the growth of the penicillin-producing mould. Thus, phenylacetic acid acts as a precursor for benzylpenicillin.

From the British patent specification No. 643,514 it is known that a great number of penicillins can be produced by adding other side-chain precursors to the culture medium. These precursors are monosubstituted acetic acids or compounds which the mould can easily convert to monosubstituted acetic acids. Thus, by using phenoxyacetic acid as a precursor phenoxymethylpenicillin (penicillin V) is obtained as the predominant constituent of the mixture of penicillins produced.

From "Nature," No. 4656 (of January 24, 1959), page 257, it is known that 6-aminopenicillanic acid is formed in penicillin fermentations carried out in the absence of added side-chain precursors. The presence of the said amine was indicated when such a fermentation liquor, after removal of natural penicillins by solvent extraction at low pH, was treated with an excess of phenylacetyl chloride in the presence of a weak base such as sodium bicarbonate. This reaction resulted in the formation of benzylpenicillin. Similarly, reaction with phenoxyacetyl chloride resulted in the formation of phenoxymethylpenicillin (penicillin V).

The Belgian patent specification No. 569,728 describes how a number of penicillins can be produced from 6-aminopenicillanic acid by reaction with acid chlorides or acid anhydrides. By this method it is possible to produce many penicillins which cannot be produced by fermentation.

Furthermore, the said specification describes how 6-aminopenicillanic acid can be isolated from the fermentation liquor by concentrating the same, thereafter treating it with an ion-exchange resin, eluting the resin, for example with diluted hydrochloric acid, adjusting the pH to about neutral, concentrating the eluate, preferably in vacuo, precipitating the 6-aminopenicillanic acid by adjusting the pH to about 4.3 (the isoelectric point of 6-aminopenicillanic acid) by adding an acid, for example hydrochloric acid, and separating the crystalline precipitate from the solution.

However, the aforementioned fermentation process without adding side-chain precursors only provides low yields of 6-aminopenicillanic acid, and the isolation of that substance from the fermentation liquor is difficult and expensive, since the extraction with organic solvents commonly used in the penicillin manufacture cannot be applied for the isolation of 6-aminopenicillanic acid due to unfavourable partition coefficients. Therefore, concentration of large volumes of liquid is necessary.

It has now been found that 6-aminopenicillanic acid can be produced by adding a penicillin or a mixture of penicillins produced by a fermentation process to a culture medium wherein a mould is grown which produces de-acylating enzymes capable of de-acylating penicillins, whereafter the mould is grown in the culture medium in the presence of the penicillin until a substantial part of the penicillin has been converted into 6-aminopenicillanic acid.

Such moulds produce many other enzymes, and therefore it could not have been expected that the de-acylation of penicillins could be effected by living moulds instead of using enzyme preparations produced from them. When the de-acylation of the penicillin is effected by the activity of the living mould the production of the enzyme preparation is omitted, whereby the whole procedure is considerably simplified. Besides, by the method of the invention considerably higher degrees of conversion of the penicillin to 6-aminopenicillanic acid can be obtained than by using enzyme preparations produced from moulds.

Preferably, the penicillin employed as a starting material is added to a culture medium in which the mould has already been grown for at least 24 hours, preferably at 25–30° C. and pH=6.5–8.0. The culture medium should contain a carbon source, for example glucose, and the inorganic substances necessary for the growth of the mould.

Among the moulds which can be used in the method of the invention can be mentioned those belonging to the genera Monotospora; Stemphylium; Cylindrocarpon, such as *C. tonkinense*; Cephalosporium; Aspergillus, such as *A. oryzae* and *A. flavus*; and Fusarium. All these genera belong to the order Hyphomycetales (by some authors denominated Hyphomycetes, Hyphales or Moniliales). It has been found that the species of the genus Fusarium are particularly suitable, since they are capable of effecting high degrees of conversion of penicillins into 6-aminopenicillanic acid. Among the suitable species of Fusarium the following can be mentioned: *F. anguioides, F. argillaceum, F. avenaceum, F. bulbigenum, F. caeruleum, F. culmorum, F. equiseti, F. lateritium, F. minimum, F. moniliforme, F. oxysporum, F. sambucinum, F. semisectum, F. solani and F. sulphureum*. It should be noted that *F. argillaceum* is the imperfect form corresponding to the perfect form *Hypomyces solani*, and that *F. moniliforme* is the imperfect form corresponding to the perfect form *Gibberella fujikuroi*, both perfect forms being classified under the class Ascomycetes, whereas the genus Fusarium belongs to the class of Fungi Imperfecti. Species belonging to both of the said genera which represent perfect forms are suitable for the deacylation of penicillins.

Compared with the method described in the aforementioned Belgian specification, the method of the invention offers the advantage that it uses as starting materials penicillins which are produced at low cost by the ordinary fermentation process employing the precursor appropriate for the formation of the penicillin in question, and that higher concentrations of 6-aminopenicillanic acid can be obtained, whereby the isolation of that substance is greatly facilitated.

Any penicillin or mixture of penicillins produced by fermentation can be used as a starting material, preferably in the form of a water-soluble inorganic salt, such as the sodium, the potassium, the calcium, or the ammonium salt. The penicillin salt used need not be of the degree of purity required for therapeutical purposes. It is preferably added to the culture medium in solid form or as a comparatively concentrated aqueous solution. Benzylpenicillin is less suitable than phenoxymethylpenicillin, because the latter is more rapidly de-acylated by the moulds. n-Heptylpenicillin (penicillin K) is also more rapidly de-acylated than benzylpenicillin. However, the cost of production of n-heptylpenicillin is higher than for phenoxymethylpenicillin, because no precursor is known which is capable of promoting the formation of n-heptyl-penicillin by the penicillin-producing mould.

The solution obtained by the de-acylation of the penicillin can be purified and concentrated by adsorption and subsequent elution. An ion-exchange resin or active carbon may be used as adsorbent, and in both cases a dilute solution of an acid can suitably be used for the elution. These operations can advantageously be preceded or followed, or both preceded and followed, by a concentration by evaporation in vacuo. Before such a concentration, the pH of the solution should be adjusted to a value between 3 and 7. From the final, purified and concentrated solution the 6-aminopenicillanic acid can be precipitated in crystalline form by adjusting the pH to about 4.3.

If the solution obtained by the de-acylation of the penicillin still contains an appreciable amount of un-transformed penicillin, it is preferable, before recovering the 6-aminopenicillanic acid, to remove at least the bulk of the remaining penicillin by acidifying the solution and extracting it with an organic solvent of the kind ordinarily used for the extraction of penicillins, for example butyl acetate. The mycelium of the mould should be removed from the liquid before the 6-aminopenicillanic acid is recovered from the same.

It has been found that when the contents of the culture medium of growth-promoting biological materials, such as corn steep liquor or soy bean meal, are reduced to such an extent that the total amount of these materials, calculated as dry substance, divided by the initial amount of the penicillin, calculated as free acid, is kept below 0.5, preferably below 0.25, the adsorption and elution steps in the hereinbefore described procedure for the isolation of 6-aminopenicillanic acid can be omitted, if a mould is used which is capable of effecting a comparatively rapid de-acylation of the penicillin. It has been found that the species belonging to the genus Fusarium are capable of effecting a very rapid de-acylation of penicillins, and therefore, they are particularly suitable for performing the embodiment of the invention hereinbefore described, in which reduced amounts of growth-promoting biological materials are applied. A de-acylation sufficiently rapid for the said purpose can also be obtained with many species of the other genera hereinbefore mentioned, such as the species of the genus Cephalosporium. Preferably, the initial concentration of the penicillin in the culture medium should be between 1 and 4%.

When the de-acylation is carried out under the specific conditions hereinbefore defined, the procedure of isolating the 6-aminopenicillanic acid from the culture medium substantially consists of the steps of removing the mycelium of the mould from the culture medium, concentrating the solution thereby obtained by evaporation in vacuo, adjusting the pH of the concentrated solution to a value about 4.3 and separating the 6-aminopenicillanic acid thereby precipitated from the solution.

The invention will now be illustrated by the following examples.

*Example 1*

*Aspergillus oryzae* was grown in 5 litres of a culture medium of the following composition:

| | Parts by weight |
|---|---|
| Water | 1000 |
| Corn steep liquor | 20 |
| Glucose | 20 |
| $MgSO_4 \cdot 7H_2O$ | 2 |
| $KNO_3$ | 5 |

After 36 hours' growth, 10.0 g. of sodium benzylpenicillinate dissolved in 100 ml. of water were added, and thereafter the culture was stirred and aerated in a 10 litre fermenting vessel at 27–29° C., the pH being kept between 5.5 and 6.5. 32 hours after the addition of the penicillin, the antibiotic activity, determined by the cup plate method described by N. G. Heatly in Biochem. J., vol. 38 (1944), page 61, had decreased to 250 international units (I.U.) of penicillin per ml., corresponding to less than 10% of the original activity. The mycelium was then filtered off, and two samples, each of 5 microlitres, of the filtrate were chromatographed on Whatman paper No. 1 using the solvent system indicated in the text below FIG. 1 of the aforementioned article in "Nature." One of the two paper strips was sprayed with a 3% aqueous solution of $NaHCO_3$ and subsequently with a 5% solution of phenylacetyl chloride in acetone. The two strips were placed on an agar plate seeded with *Staphylococcus aureus*, whereafter the plate was kept at 37° C. for 20 hours. Around both strips smaller spots at the same level about half-way down the strips indicated inhibitory zones on the agar plate due to untransformed benzylpenicillin. A larger oval spot around a point of the sprayed strip near the starting line indicated the presence of a greater amount of benzylpenicillin developed from 6-aminopenicillanic acid by the spraying with phenylacetyl chloride. The $R_f$ value of this spot was in accordance with that apparent from strip 3 in FIG. 1 of the aforementioned article in "Nature."

*Example 2*

150 ml. of a sterilized culture medium of the following composition:

| | | |
|---|---|---|
| Glucose | g | 10.00 |
| Asparagin | g | 0.75 |
| $(NH_4)_2SO_4$ | g | 2.64 |
| $KH_2PO_4$ | g | 2.38 |
| $K_2HPO_4$ | g | 5.56 |
| $MgSO_4 \cdot 7H_2O$ | g | 1.00 |
| $CuSO_4 \cdot 5H_2O$ | mg | 6.4 |
| $FeSO_4 \cdot 7H_2O$ | mg | 1.1 |
| $MnCl_2 \cdot 4H_2O$ | mg | 7.9 |
| $ZnSO_4 \cdot 7H_2O$ | mg | 1.5 |
| Yeast extract, conc. | g | 5.0 |
| Corn steep liquor, 50% | ml | 20.0 |
| $CaCO_3$ | g | 5.0 |
| Water up to 1000 ml. | | | were inoculated with 1 ml. of a suspension of spores from *Fusarium avenaceum*, strain L.P.P. 1102, and the culture medium was kept at 27° C. for 24 hours under stirring and aeration. Thereafter the culture was added to 5 litres of sterile culture medium of the same composition, which subsequently was kept at 27° C. under stirring and aeration for a further 72 hours in a 10 litre glass fermentor.

Thereafter 20.00 g. of potassium phenoxymethylpenicillinate were added to the culture, and the growth of the mould was continued under the same conditions for further 48 hours. The mycelium was then filtered off, and the 6-aminopenicillanic acid was isolated from the filtrate as hereinafter described:

The pH of the filtrate was adjusted to a value of 7.5, and the filtrate was passed through a column containing 1 litre of the chloride form of the ion exchanging resin "Amberlite IRA–401 S" (marketed by Rohm & Haas Company, Philadelphia, Pa., U.S.A.) in the course of two hours. Thereafter the column was washed with water and the moist resin transferred to a 3 litre beaker together with 500 ml. of water. To this material concentrated hydrochloric acid was added to pH=1.8. Thereupon, the resin was filtered off and washed on the filter with 500 ml. of water. The combined filtrate and wash solutions were neutralized with 2-normal aqueous NaOH to pH= 6.5 and subsequently concentrated by evaporation in vacuo to a volume of 100 ml. The pH of the concentrated solution was adjusted to a value of 4.3 by adding concentrated hydrochloric acid, and the 6-aminopenicillanic acid thereby precipitated was filtered off, washed with water and subsequently with acetone, and dried. Thereby, 8.5 g. of crude product were obtained. This product was suspended in 75 ml. of water and brought into solution by adding a dilute aqueous solution of NaOH. From this solution the 6-aminopenicillanic acid was precipitated by adjusting the pH of the solution to a value of 4.3 with hydrochloric acid. The precipitate thus formed was filtered off, washed with water and subsequently with acetone, and dried. Thereby, 7.7 g. of 6-aminopenicillanic acid were obtained with M.P. 198–200° C.

Example 3

800 litres of a sterile culture medium of the following composition:

|   | kg. |
|---|---|
| Corn steep liquor, 50% | 24.0 |
| Lactose | 24.0 |
| $CaCO_3$ | 3.0 |

Tap water up to 900 litres.

were made up in a fermentor of stainless steel and inoculated with 2 litres of a culture of *Fusarium culmorum* var. *cereale*, strain L.P.P. Z.S. 1100, which culture had previously been grown for 48 hours. Thereafter, the inoculated culture medium was stirred and aerated at 27° C. and a pH=6.5 for 66 hours. Thereby, an abundant growth of the mould was effected. After this period of growth a sterile solution of 18.0 kg. of crude (95% purity) potassium phenoxymethylpenicillinate in 90 litres of tap-water was added, and the stirring and aeration were continued for a further 48 hours at 27° C., a pH of 6–7 being maintained by continuous addition of an aqueous solution of sodium hydroxide. At the end of this period of time the content of 6-aminopenicillanic acid in the culture medium was 6 mg. per ml., which corresponds to a degree of conversion of 65%. Furthermore, the fermented culture medium contained an amount of unconverted phenoxymethylpenicillin corresponding to 4000 I.U. per ml., which corresponds to 15% of the added amount of phenoxymethylpenicillin.

The pH of the fermented culture medium was adjusted to 7.5, 40 kg. of a diatomaceous earth were added to serve as a filter aid, and the mycelium was removed from the culture medium by filtration. Thereafter, the filtrate was passed in the course of 8 hours through a column containing 300 litres of the strongly basic, anion-exchanging synthetic resin "Amberlite IRA–401 S," which has a low degree of cross-linking. Thereafter, the column was washed with water, and the moist resin was transferred to an 800 litre vessel of stainless steel equipped with a stirrer. 200 litres of demineralized water were added, and during 3 hours 20% hydrochloric acid was added while stirring, until a pH of 1.95 had been reached. Thereafter, the resin was filtered off and washed three times, each time with 70 litres of demineralized water. The pH of the combined filtrate and wash solutions having a total volume of 400 litres was adjusted to 7.0 by adding a 33% aqueous solution of NaOH, whereafter the solution was concentrated to a volume of 75 litres by evaporation in vacuo. The concentrated solution was filtered, and the pH of the filtrate was adjusted to 4.05 by the addition of concentrated hydrochloric acid. The 6-aminopenicillanic acid thereby precipitated was filtered off, washed with water and subsequently with acetone, and dried. Thereby, 3.1 kg. of a product with M.P. 199–201° C. and a degree of purity of 93% were obtained.

This crude product was suspended in 12 litres of water, and to the suspension was added a 33% aqueous solution of NaOH until a clear solution had been obtained. The pH of this solution was 7.3. The solution was then treated with 30 g. of active carbon for 15 minutes and subsequently filtered. The pH of the filtrate was adjusted to 4.05 by addition of concentrated hydrochloric acid, and the 6-aminopenicillanic acid thereby precipitated was filtered off and washed with water, subsequently with acetone, and dried. Thereby, 2.8 kg. of 6-aminopenicillanic acid were obtained with M.P. 202–204° C. (with decomposition) and a degree of purity of 98%.

Example 4

100 ml. of a sterile culture medium of the following composition:

|   | G. |
|---|---|
| $(NH_4)_2HPO_4$ | 2.5 |
| Glucose | 10.0 |
| CaCO | 5.0 |

Tap water up to 1.0 litre.

were adjusted to pH=6.5 and inoculated in a 300 ml. flask with a suspension of spores of a strain of a Fusarium species, which strain has provisionally been designated as L.P.P. 1571, whereafter the flask was shaken for 72 hours at 27° C. Thereafter, 2.0 g. of potassium phenoxymethylpenicillinate were added, and the flask was shaken for further 72 hours. After this period of time the content of phenoxymethylpenicillin, determined by the agar cup method, had diminished to less than 300 I.U. of penicillin per ml.

The mycelium was then filtered off, the pH of the filtrate adjusted to 6.5, and the filtrate concentrated by evaporation in vacuo to a volume of 15 ml. After the concentrated solution had been filtered, its pH was adjusted to 4.3 by addition of concentrated hydrochloric acid. The precipitate thereby formed was filtered off and washed with water and subsequently with acetone, and dried. Thereby, 710 mg. of 6-aminopenicillanic acid were obtained with a M.P. of 199–201° C. (with decomposition).

Example 5

5 litres of a sterile culture medium of the following composition:

|   | G. |
|---|---|
| Corn steep liquor, 50% | 10.0 |
| Glucose | 20.0 |
| $CaCO_3$ | 5.0 |

Tap water up to 1.0 litre.

were adjusted to pH=6.5 and inoculated in a 10 litre glass fermentor with 200 ml. of a culture of the aforementioned Fusarium strain L.P.P. 1571 previously grown for 24 hours, whereafter the inoculated culture medium was stirred and aerated for 48 hours, while the pH was maintained at 6.5. Thereafter, 100 g. of potassium phenoxymethylpenicillinate were added, and the stirring and aeration was continued for a further 72 hours at 27° C. and pH=6.5.

The mycelium was then filtered off, the pH of the filtrate adjusted to 6.5, and the filtrate concentrated by evaporation in vacuo to 500 ml. After the concentrated solution had been filtered, its pH was adjusted to 4.3 by addition of concentrated hydrochloric acid. The precipitate thereby formed was filtered off and washed with water and subsequently with acetone, and dried. Thereby, 37 g. of 6-aminopenicillanic acid were obtained with a degree of purity of 93% and M.P. 196–199° C.

This product was suspended in 150 ml. of water and brought into a solution having pH=7.5 by addition of a 30% aqueous solution of NaOH. An aqueous solution of 1.0 g. of aluminium sulphate was added, the precipitate thereby formed was filtered off, and the filtrate adjusted to pH=4.3 by adding concentrated hydrochloric acid. The precipitate thereby formed was filtered off and washed with water and subsequently with acetone, and dried. Thereby, 32 g. of purified 6-aminopenicillanic acid were obtained with M.P. 205–207° C.

Example 6

The ability of a great number of moulds to produce 6-aminopenicillanic acid by de-acylation of phenoxymethylpenicillin was determined by using the following method:

100 ml. of a sterile culture medium having the composition indicated in Example 2 were adjusted to pH=6.5 and inoculated in a 300 ml. shaking flask with a suspension of spores from the mould to be tested, whereafter the flask was shaken at 27° C. for 48 hours. Thereafter, 2.0 g. of potassium phenoxymethylpenicillinate were added, and the flask was shaken under aeration at 27° C. for further 48 hours. After the said periods of incubation and aeration the mycelium was filtered off, and the filtrate acidified to pH=2.0, and subsequently extracted twice with butyl acetate to remove unconverted phenoxymethylpenicillin. Thereafter, the content of 6-aminopenicillanic acid in the aqueous phase was determined iodometrically. The results obtained with a number of the most suitable moulds are listed in the following table, in which the figures in the right column indicate the degree of conversion of phenoxymethylpenicillin into 6-aminopenicillanic acid. The L.P.P culture designations are those of Leo Pharmaceutical Products of Copenhagen, Denmark, and the cultures are available to anyone who would wish to inspect them.

| Species | | Strain | |
|---|---|---|---|
| Fusarium anguioides | L.P.P | 1567 | 92% |
| Fusarium avenaceum | L.P.P | n 33 | 82% |
| Do | L.P.P | 1248 B | 86% |
| Do | L.P.P | 1255 | 83% |
| Do | L.P.P | 1428 | 79% |
| Do | L.P.P | 1677 | 82% |
| Do | L.P.P | 1681 | 80% |
| Fusarium culmorum | L.P.P | n 32 | 77% |
| Do | L.P.P | 1248 A | 81% |
| Do | L.P.P | 1489 | 68% |
| Fusarium culmorum var. cereale | L.P.P | 1501 | 93% |
| Do | L.P.P | 1504 | 89% |
| Fusarium equiseti v. bullatum | L.P.P | 1454 | 92% |
| Do | L.P.P | 1508 | 84% |
| Fusarium lateritium | L.P.P | 1687 | 76% |
| Fusarium minimum | L.P.P | n 34 | 72% |
| Fusarium moniliforme | L.P.P | n 12 | 78% |
| Fusarium moniliforme v. subglutinans | L.P.P | 1682 | 75% |
| Fusarium oxysporum | L.P.P | 9 | 84% |
| Do | L.P.P | 1637 | 80% |
| Fusarium semisectum | L.P.P | 1493 | 93% |
| Do | L.P.P | 1540 | 82% |
| Monotospora sp | L.P.P | 1703 | 51% |
| Stemphylium sp | L.P.P | 1758 | 04% |
| Cylindrocarpon tonkinense | L.P.P | ZU 4 | 68% |
| Cephalosporium sp. (Cephalosporium ciferrii Verona) | L.P.P | 1748 | 78% |
| Cephalosporium sp. (Cephalosporium acremonium Cda.) | L.P.P | 1753 | 71% |
| Do | L.P.P | 1770 | 71% |
| Do | L.P.P | 1779 | 80% |
| Aspergillus flavus | L.P.P | ZM 3 | 60% |
| Aspergillus oryzae | L.P.P | ZM 4 | 41% |
| Do | L.P.P | ZM 9 | 58% |
| Do | L.P.P | ZM 10 | 55% |
| Do | A.T.C.C | 7252 | 48% |
| Do | A.T.C.C | 11601 | 34% |
| Do | A.T.C.C | 11866 | 51% |
| Aspergillus niger | A.T.C.C | 10254 | 38% |
| Aspergillus sojae | A.T.C.C | 11906 | 54% |
| Aspergillus terreus | A.T.C.C | 10029 | 48% |
| Aspergillus effusus | L.P.P | ZM 5 | 48% |
| Gibberella fujikuroi | A.T.C.C | 10052 | 53% |
| Hypomyces solani | C.B.S | QM 679 | 88% |

What I claim is:

1. A method for the production of 6-aminopenicillanic acid, which comprises adding a penicillin produced by a fermentation process to a fluid culture medium wherein a mould is grown submerged and under aeration, said mould being selected from the group consisting of Monotospora 1703, Stemphylium 1758, *Cylindrocarpon tonkinense*, *Cephalosporium ciferrii* Verona, *Cephalosporium acremonium* Cda., the following members of the genus Aspergillus: *A. flavus, A. oryzae, A. niger, A. sojae, A. terreus* and *A. effusus*, and the genus Fusarium, and thereafter growing the mould in the culture medium until a substantial part of the penicillin has been converted into 6-aminopenicillanic acid.

2. A method for the production of 6-aminopenicillanic acid, which comprises adding phenoxymethylpenicillin to a culture medium in which the amounts of growth-promoting biological materials, calculated as dry substances, divided by the initial amount of phenoxymethylpenicillin, calculated as free acid, is below 0.5, growing in said culture medium a mould which is selected from the group consisting of *Cephalosporium ciferrii* Verona, *Cephalosporium acremonium* Cda. and the genus Fusarium, until a substantial part of the phenoxymethylpenicillin has been converted into 6-aminopenicillanic acid, isolating the 6-aminopenicillanic acid from the culture medium by removing the mycelium from the same, concentrating the solution thereby obtained by evaporation in vacuo, adjusting the pH of the concentrated solution to a value of about 4.3, and separating the 6-aminopenicillanic acid thereby precipitated from the solution.

3. A method for the production of 6-aminopenicillanic acid, which comprises adding a penicillin to a fluid culture medium wherein a mould is grown submerged and under aeration, said mould being *Aspergillus flavus*.

References Cited by the Examiner

J. Agr. Chem. Soc., Japan, 23, page 411 (1950).

Antibiotics, vol. II, Oxford University Press, Oxford Medical Publications, 1949, pages 1030–1032.

A. LOUIS MONACELL, *Primary Examiner.*

TOBIAS E. LEVOW, A. H. WINKELSTEIN, *Examiners.*